United States Patent [19]

Beard

[11] Patent Number: 4,583,317

[45] Date of Patent: Apr. 22, 1986

[54] ANIMAL TRAP

[76] Inventor: Chester E. Beard, Rte. 1, Box 357, Hickory Flatt, Miss. 38633

[21] Appl. No.: 725,647

[22] Filed: Apr. 22, 1985

[51] Int. Cl.⁴ .............................................. A01M 23/20
[52] U.S. Cl. ........................................................ 43/61
[58] Field of Search ..................................... 43/61, 58

[56] References Cited

U.S. PATENT DOCUMENTS

| | | | |
|---|---|---|---|
| 812,472 | 2/1906 | Alsobrook | 43/61 |
| 1,186,408 | 6/1916 | Knights | 43/61 |
| 1,421,298 | 6/1922 | Paetta | 43/61 |
| 2,524,504 | 10/1950 | Woolworth | 43/61 |
| 2,752,722 | 7/1956 | Gardner | 43/61 |
| 3,113,395 | 12/1963 | Van Kuren | 43/61 |
| 4,310,984 | 1/1982 | Brubaker | 43/61 |
| 4,462,181 | 7/1984 | Broman | 43/61 |

FOREIGN PATENT DOCUMENTS 915385 11/1946 France ................................ 43/61

*Primary Examiner*—Gene P. Crosby
*Attorney, Agent, or Firm*—Walker & McKenzie

[57] ABSTRACT

An animal trap for use with a piece of bait to trap animals, such as mice. The trap includes a hollow body member having an access opening, a trap door movable between an open position in which the access opening is open and a closed position in which the access opening is closed, and a trigger structure for selectively holding the trap door in the open position. The trigger structure includes a bait holder to hold the piece of bait. The trigger structure allows the trap door to move to the closed position if the piece of bait is removed from the bait holder.

6 Claims, 10 Drawing Figures

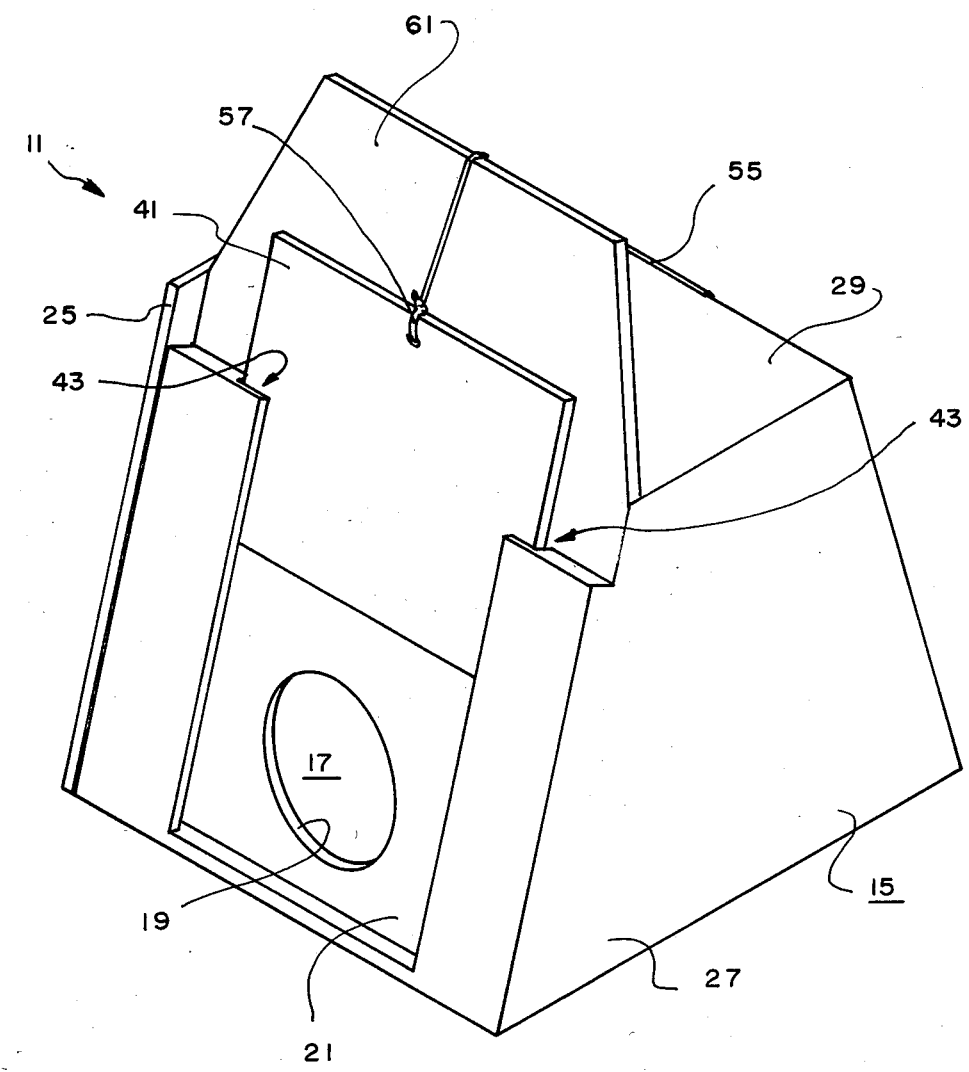
FIG. I

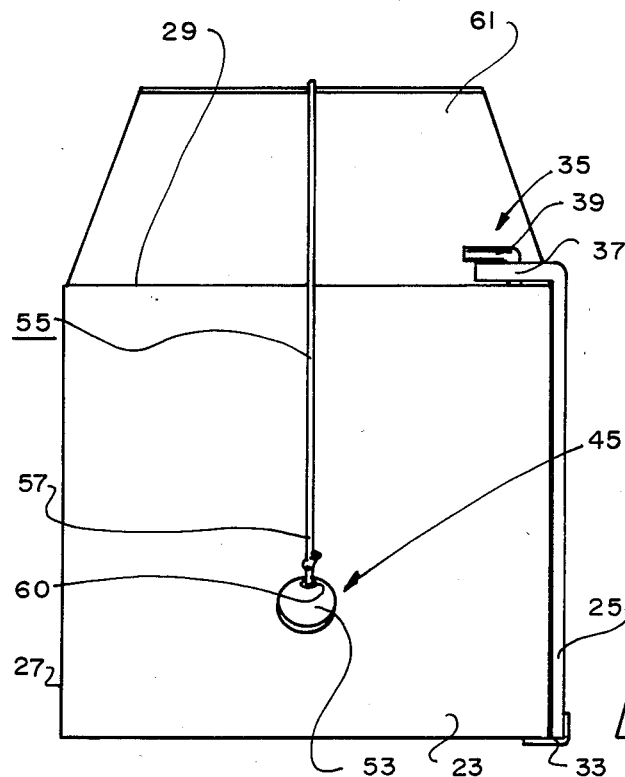
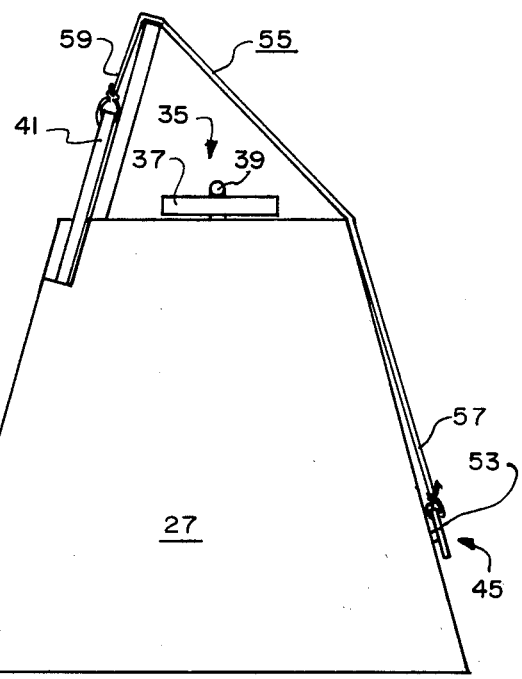
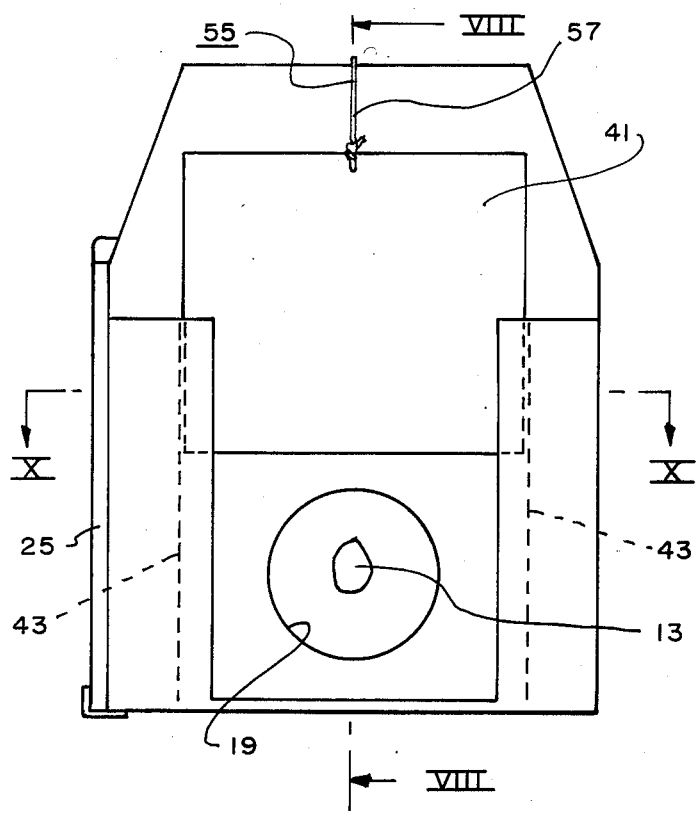
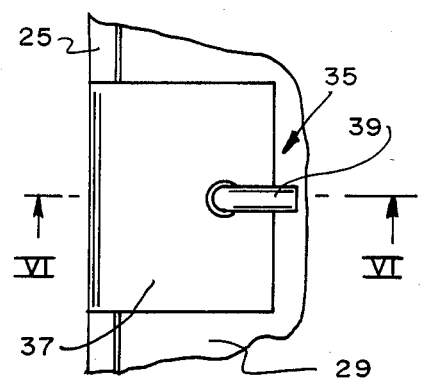
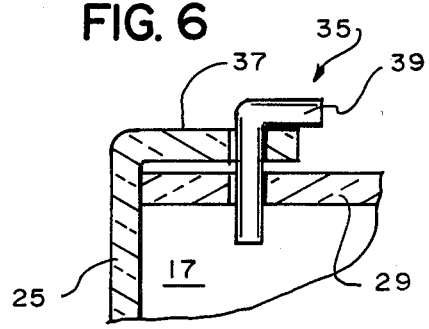

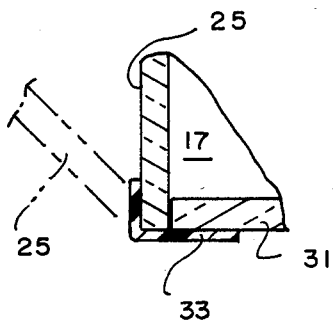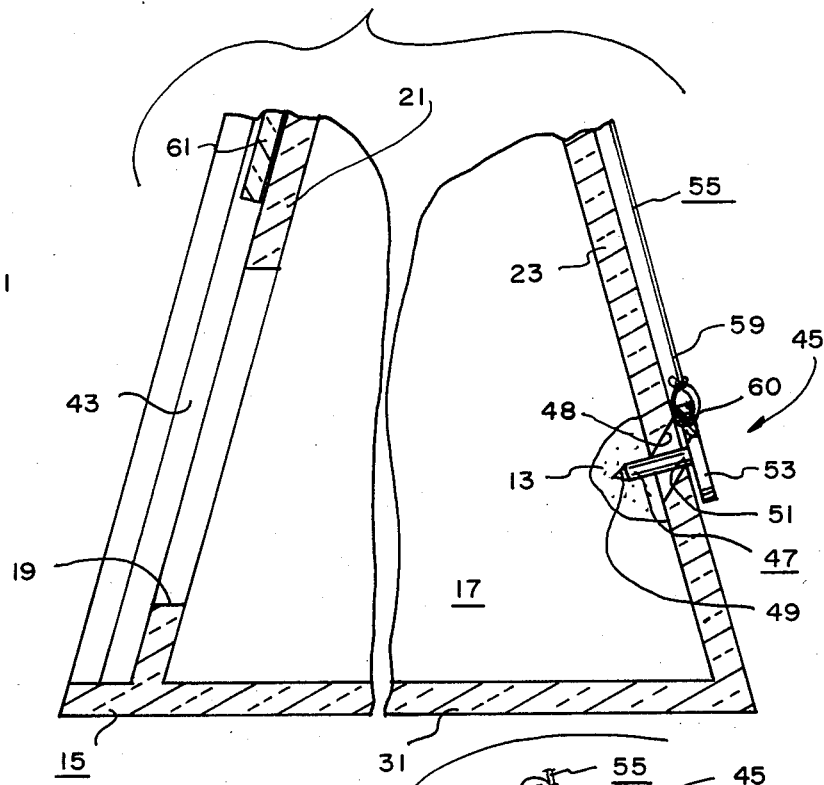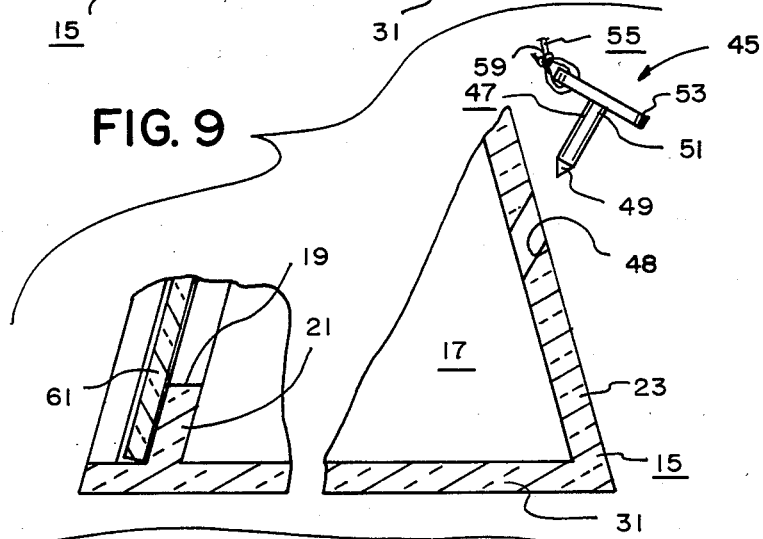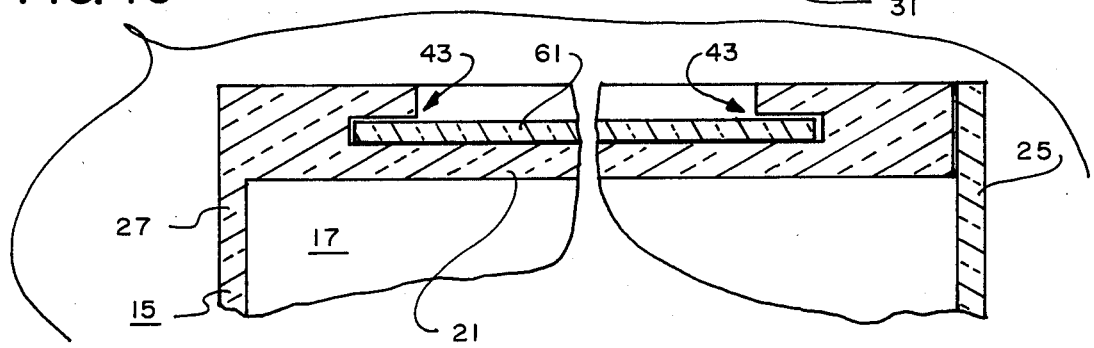

ANIMAL TRAP

BACKGROUND OF THE INVENTION

1. Field of the Invention

The present invention relates, in general, to boxlike devices for trapping animals, such as mice and the like.

2. Description of the Prior Art

Many means have heretofore been developed in an attempt to rid an environment of unwanted animals, such as mice, rats and the like. The following U.S. patents disclose boxlike or cagelike means designed to trap an animal, such as mice or the like, within the interior thereof: Paetta, U.S. Pat. No. 1,421,298; Pearl, U.S. Pat. No. 1,735,786; McDonald, U.S. Pat. No. 2,059,954; Alday, U.S. Pat. No. 2,343,444; Gardner, U.S. Pat. No. 2,752,722; and Brubaker, U.S. Pat. No. 4,310,984. One major disadvantage with the traps disclosed by all the above patents is that the animal to be trapped must exert a pull on the trigger mechanism thereof (i.e., the animal must physically pull or otherwise move the trigger mechanism in order for the trap to close.) None of the above patents disclose or suggest the present invention.

SUMMARY OF THE INVENTION

The present invention is directed towards providing an improved animal trap. The concept of the present invention is to provide a boxlike means that is activated to trap an animal, such as a mouse, within the interior thereof solely by the animal eating a piece of bait without requiring the animal to apply any type of pressure to a locking device or the like.

The trap of the present invention comprises, in general, a body member having a hollow interior and having an access opening into the hollow interior; trap door means slidably mounted to the body member for movement between an open position in which the access opening is open and a closed position in which the access opening is obstructed; and trigger means for selectively holding the trap door means in the open position, the trigger means including a bait holding means for holding a piece of bait, the trigger means allowing the trap door means to move to the closed position if the piece of bait is removed from the bait holding means.

BRIEF DESCRIPTION OF THE DRAWINGS

FIG. 1 is a perspective view of the animal trap of the present invention with the trap door means thereof in an open position.

FIG. 2 is a rear elevational view thereof.

FIG. 3 is a right side elevational view thereof.

FIG. 4 is a front elevational view thereof.

FIG. 5 is an enlarged top plan view of a portion thereof.

FIG. 6 is a sectional view substantially as taken on line VI—VI of FIG. 5.

FIG. 7 is an enlarged sectional view of a portion of the body thereof showing the access door thereof in an open position in broken lines.

FIG. 8 is an enlarged sectional view substantially as taken on line VIII—VIII of FIG. 4 with portions thereof broken away for clarity.

FIG. 9 is a sectional view similar to FIG. 8 but with the trap door means in a closed position.

FIG. 10 is an enlarged sectional view substantially as taken on line X—X of FIG. 4 with portions thereof broken away for clarity.

DESCRIPTION OF THE PREFERRED EMBODIMENT

The animal trap 11 of the present invention is for use with a piece of bait 13, such as a piece of nut, seed, or the like (see FIG. 8), to trap an animal, such as a mouse, within the interior thereof.

The trap 11 includes a body member 15 having a hollow interior 17 and having an access opening 19 into the hollow interior 17 for allowing an animal to freely enter the interior 17. Thus, the body member 15 is defined by a boxlike unit including a front wall member 21 having the access opening 19 formed therethrough, a back wall member 23, a first side wall member 25, a second side wall member 27, a top member 29 and a bottom member 31 with the edges of the various members joined together to form a rigid unit. One of the side wall members is preferably movably mounted relative to the other members to allow easy access into the interior 17 for purposes of baiting the trap 11, removing a trapped animal from the interior 17, or the like, as will hereinafter become apparent. The specific construction of the body member 15 may vary as will be apparent to those skilled in the art. For example, the body member 15 may be molded out of a transparent, acrylic plastic, or the like. More specifically, the front member 21, back member 23, second side member 27, top member 29, and bottom member 31 may be injection molded as a one-piece, integral unit out of acrylic plastic in a manner apparent to those skilled in the art and the second side member 25 may be constructed as a separate piece and hingably attached to the bottom member 31 in any manner, such as with a flexible, waterproof tape 33 which forms a hinge means to hingably attach the first side member 25 to the bottom member 31 to allow the first side member 25 to move between a closed position as shown in solid lines in FIG. 7 and an open position as shown in broken lines in FIG. 7. Lock means 35 may be provided to allow the first side member 25 to be selectively locked to the top member 29, or the like, to hold the first side member 25 in a normally closed position. The lock means 35 may consist simply of an extension 37 on the first side member 25 and a pin member 39 for extending through apertures in the extension 37 and the top member 29 to thereby lock the first side member 25 relative to the top member 29 (see, in general, FIGS. 5 and 6).

The trap 11 includes a trap door means 41 movably mounted to the body member 15 for movement between an open position in which the access opening 19 is opened and a closed position in which the access opening 19 is obstructed. The trap door means 41 may consist simply of a flat, platelike member molded out of a transparent, acrylic plastic or the like and slidably mounted relative to the front member 21 of the body member 15 for movement due to the force of gravity from a raised or open position (see, in general, FIG. 8) to a lowered or closed position (see FIG. 9). Guide means are preferably provided on the front member 21 of the body member 15 for guiding the trap door means 41 between the raised and lowered positions. The guide means may consist simply of a pair of opposed channel members 43 mounted or attached to the front member 21 on each side of the access opening 19 and engaging opposite sides of the trap door means 41 to guidingly constrain the trap door means 41 for movement between the raised and lowered positions. The channel members 43 may be constructed as an integral part of the front member 21 of the body member 15 during the injection molding of the front member 21 as will be apparent to those skilled in the art.

The trap 11 includes a trigger means for selectively holding the trap door means 41 in the open position. The trigger means includes a bait holding means 45 for holding the piece of bait 13 (see FIG. 8). The bait holding means 45 preferably includes a pin member 47 for extending through an aperture 48 through the back member 23 of the body member 15. The pin member 47 has a first end 49 for being positioned within the interior 17 of the body member 15 and for holding the piece of bait 13 and has a second end 51. The pin member 47 preferably has an enlarged head portion 53 at the second end 51 thereof for controlling the depth of insertion of the first end 49 into the interior 17 of the body member 15. The first end 49 of the pin member 47 is preferably sharpened to a point to allow the piece of bait 13 to be easily pushed thereon. The pin member 47 may be constructed of metal, or the like, in any manner now apparent to those skilled in the art. More specifically, the pin member 47 may consist substantially of a typical "thumb tack", or the like, of well-known construction.

The trigger means preferably includes a coupling means for coupling the second end 51 or enlarged head portion 53 of the pin member 47 to the trap door means 41 and for holding the trap door means 41 in the open position as long as the first end 49 of the pin member 47 is positioned within the interior 17 of the body member 15. The coupling means preferably consists of a flexible, elongated cord 55 having a first end 57 attached to the trap door means 41 and having a second end 59 attached to the head portion 53 of the end member 47 (see, in general, FIG. 3). An aperture 60 is preferably provided in the head portion 53 to allow the cord 55 to be attached thereof as clearly shown in FIGS. 2 and 8. The cord 55 may consist of monofilament or the like.

The body member 15 may include an extension member 61 attached to the front member 21 and extending above the top member 29 (see FIG. 1). The cord 55 extends from the top of the trap door means 41 and over the extension member 61 to the head portion 53 of the pin member 47. The extension member 61 thus provides support for the trap door means 41 when the trap door means 41 is in the open position and provides a guide for the cord 55. The extension member 61 may be injection molded as an integral component with the front member 21 of the body member 15 as will be apparent to those skilled in the art.

The back member 23 preferably has the aperture 48 therethrough for receiving the pin member 47 to allow the first end 49 of the pin member 47 to be inserted through the back member 23 into the interior 17 of the body member 15 (see, in general, FIGS. 8 and 9). The relative shape and size of the aperture 48 and pin member 47 and the attachment of the cord 55 to the head portion 53 (rather than directly to the pin member 47) are critical to the present invention. More specifically, the relative shape and size of the aperture 48 and pin member 47 ensures the quick exit of the pin member 47 from the aperture 48 if the piece of bait 13 is removed from the first end 49 of the pin member 47. Such an arrangement causes the trigger means to be activated to allow the trap door means 41 to close without requiring the animal to exert any direct pressure on the trigger means. Rather, the animal to be trapped needs only to eat the piece of bait 13 from the first end 49 of the pin member 47 to activate the trigger means and allow the trap door means 41 to quickly move to the closed position. The front and back members 21, 23 preferably have planar face surfaces which are angled toward one another with the top ends thereof closer together than the bottom ends thereof, thus forming a substantially truncated cone shape when viewed from either end. The aperture 48 preferably consists of a cylindrical bore with its axis extending at an angle to the horizontal (i.e., to the bottom member 31) through the back member 23 downwardly into the interior 17 of the body member 15 (see, in general, FIGS. 8 and 9). As thus constructed, the pin member 47 will be quickly and automatically removed from the aperture 48 with the aid of the force of gravity acting on the trap door means 41 and through the cord 55 to pull the pin member 47 upwardly out of the aperture 48, thus allowing the trap door means 41 to close if the piece of bait 13 is removed from the first end 49 of the pin member 47.

To use the trap 11 the lock pin member 39 of the lock means 35 is removed to allow the first side member 25 to be opened. A piece of bait 13 is then inserted into the interior 17 of the body member 15 and the first end 49 of the pin member 47 is inserted through the aperture 48 allowing the piece of bait 13 to be placed on the first end 49 of the pin member 47. The first side member 25 is then closed and the pin member 47 replaced to lock the first side member 25 in the closed position. The trap 11 is then placed in any desired location. The piece of bait 13 will attract an animal into the interior 17 of the body member 15 through the access opening 19. Upon removal of the piece of bait 13 when an animal enters the interior 17 through the access opening 19 and eats the bait 13, the pin member 47 will quickly and automatically exit the aperture 48 allowing the trap door means 41 to quickly and automatically close, thus trapping the animal within the interior 17 of the trap.

Contrary to what many people believe, cheese is not a very good mouse bait. The best bait for mice are small seeds, such as squash, pumpkin or sunflower seeds with the outer shell removed before the seed is placed on the first end 49 of the pin member 47. The use of one-fourth or one-half of a peanut or other type nut will make a very good bait.

To dispose of any animal trapped within the interior 17, the trap 11 may be taken to a remote location and the animal released alive by merely opening the trap door means 41. Another way to dispose of trapped animals, such as mice or the like, is to fill a small container with water, place the trap 11 in the container and raise the trap door means 41 a fraction of an inch. A mouse will drown in 15 to 35 seconds. This is a humane way to catch and dispose of mice compared to a spring-type trap where the mouse sometimes stays caught but alive for many hours and compared to the dangerous and cruel method of poisoning.

As thus constructed and used, the trap 11 provides a means for trapping animals, such as mice or the like, that needs no pulling or pushing or other outside pressure from the animal to activate the trap. The only effort required by the animal is to eat the bait.

Although the present invention has been described and illustrated with respect to a preferred embodiment and a preferred use thereof, it is not to be so limited since changes and modifications can be made therein which are within the full intended scope of the invention.

I claim:

1. An animal trap for use with a piece of bait to trap animals, said trap comprising:
   (a) a body member having a hollow interior and having an access opening into said hollow interior; said body member including a front member, a back member, a first side member, a second side member, a top member and a bottom member joined together to define said hollow interior; said access opening being located through said front member; said back member of said body means having an aperture therethrough; said front and back members of said body member having planar face surfaces which are angled toward one another with the top ends thereof closer together than the bottom ends thereof, said aperture through said back member consisting of a cylindrical bore with its axis extending at an angle to the horizontal through said back member downwardly into said interior of said body member;
   (b) a trap door means movably mounted to said body member for movement between an open position in which said access opening is open and a closed position in which said access opening is obstructed;
   (c) trigger means for selectively holding said trap door means in said open position, said trigger means including a bait holding means for holding said piece of bait, said trigger means allowing said trap door means to move to said closed position if said piece of bait is removed from said bait holding means; said bait holding means of said trigger means including a pin member for extending through said aperture through said back member of said body member, said pin member having a first end for being positioned within said interior of said body member and for holding said piece of bait and having a second end; said trigger means including coupling means for coupling said second end of said pin member to said trap door means and for holding said trap door means in said open position as long as said first end of said pin member is positioned within said interior of said body member, said first end of said pin member being held within said interior of said body member only as long as said piece of bait remains thereon for causing said trap door to automatically move to said closed position if said piece of bait is removed therefrom; said aperture through said back member of said body member being shaped so as to insure the quick exit of said pin member therefrom if said piece of bait is removed from said first end of said pin member; and
   (d) guide means attached to said front member adjacent said access opening for guiding said trap door means between said open and closed positions.

2. The trap of claim 1 in which said pin member has an enlarged head at said second end thereof for controlling the depth of insertion of said first end thereof into said interior of said body member.

3. The trap of claim 2 in which said coupling means included a flexible, elongated cord having a first end attached to said trap door means and a second end attached to said head portion of said pin member.

4. The trap of claim 3 in which said body member includes an extension member attached to said front member thereof and extending above said top member thereof, said cord of said coupling member extending from said trap door means and over said extension member to said head portion of said pin member.

5. The trap of claim 4 in which said first side member is movably attached to said top member and said bottom member to allow access into said interior of said body member therethrough.

6. The trap of claim 5 in which is included a hinge means for hingably attaching said first side member to said bottom member for movement between an open and a closed position, and in which is included a lock means for locking said first side member in said closed position.

* * * * *